(12) United States Patent
Davies et al.

(10) Patent No.: US 10,874,981 B2
(45) Date of Patent: Dec. 29, 2020

(54) DUAL FILTER FOR MOISTURE REMOVAL FROM A FLUID FLOW

(71) Applicant: Norgren Limited, Lochfield (GB)

(72) Inventors: Hywel Ward Davies, Staffordshire (GB); Gary Kenneth Manning, Birmingham (GB)

(73) Assignee: NORGREN LIMITED

( * ) Notice: Subject to any disclaimer, the term of this patent is extended or adjusted under 35 U.S.C. 154(b) by 590 days.

(21) Appl. No.: 15/541,827

(22) PCT Filed: Nov. 19, 2015

(86) PCT No.: PCT/GB2015/053535
§ 371 (c)(1),
(2) Date: Jul. 6, 2017

(87) PCT Pub. No.: WO2016/110665
PCT Pub. Date: Jul. 14, 2016

(65) Prior Publication Data
US 2018/0021720 A1    Jan. 25, 2018

(30) Foreign Application Priority Data
Jan. 7, 2015    (GB) .................................. 1500189.4

(51) Int. Cl.
*B01D 53/22* (2006.01)
*B01D 53/26* (2006.01)
(Continued)

(52) U.S. Cl.
CPC ....... *B01D 53/261* (2013.01); *B01D 53/0415* (2013.01); *B01D 53/0423* (2013.01);
(Continued)

(58) Field of Classification Search
CPC ...... B01D 53/0438; B01D 2259/40096; B01D 2259/402; B01D 2259/40009;
(Continued)

(56) References Cited

U.S. PATENT DOCUMENTS 4,162,146 A    7/1979 Seibert
4,247,311 A    1/1981 Siebert et al.
(Continued)

FOREIGN PATENT DOCUMENTS

EP    1378286    1/2004
WO    WO 94/13388    6/1994

OTHER PUBLICATIONS

Corresponding International Search Report and Written Opinion for PCT/GB2015/053535 dated May 3, 2016.

*Primary Examiner* — Anthony R Shumate
(74) *Attorney, Agent, or Firm* — The Belles Group, P.C.

(57) ABSTRACT

A dual filter (100) for removing one or more components from a fluid flow is provided. The dual filter (100) comprises a first filter media (112a) and a second filter media (112b) respectively disposed in a first conduit (114a) and a second conduit (114b), and at least one manifold (120, 130) coupled to a pair of openings (116a,b) of the conduits (114a, b) wherein the at least one manifold (120, 130) is adapted to monitor and control the fluid flow through one of the filter media (112a,b).

27 Claims, 7 Drawing Sheets

(51) Int. Cl.
  *B01D 53/04* (2006.01)
  *B60T 17/00* (2006.01)

(52) U.S. Cl.
  CPC ..... *B01D 53/0438* (2013.01); *B01D 53/0446* (2013.01); *B01D 53/0454* (2013.01); *B01D 53/0462* (2013.01); *B60T 17/004* (2013.01); *B01D 2257/80* (2013.01); *B01D 2259/402* (2013.01); *B01D 2259/40007* (2013.01); *B01D 2259/40009* (2013.01); *B01D 2259/4009* (2013.01); *B01D 2259/40096* (2013.01); *B01D 2259/4566* (2013.01)

(58) Field of Classification Search
  CPC .... B01D 2259/4009; B01D 2259/4566; B01D 53/0423; B01D 53/261; B01D 2259/40007; B01D 2257/80; B01D 53/0415; B01D 53/0462; B01D 53/0446; B60T 17/004
  See application file for complete search history.

(56) References Cited

U.S. PATENT DOCUMENTS

| | | | |
|---|---|---|---|
| 4,345,572 A * | 8/1982 | Suzuki | F02M 26/35 123/568.11 |
| 4,361,425 A | 11/1982 | Hata | |
| 4,512,781 A | 4/1985 | Caralli et al. | |
| 4,544,385 A | 10/1985 | Tanaka | |
| 4,770,678 A | 9/1988 | Haslett, Jr. | |
| 10,532,296 B1 * | 1/2020 | Keenan | B01D 21/003 |
| 2003/0036033 A1 * | 2/2003 | Chandler | A61C 1/0061 433/77 |
| 2003/0042191 A1 * | 3/2003 | Nam | B01D 35/147 210/234 |
| 2003/0042192 A1 * | 3/2003 | Nam | B01D 35/1573 210/249 |
| 2006/0226058 A1 * | 10/2006 | Porter | B01D 21/0012 210/143 |
| 2007/0045165 A1 * | 3/2007 | Beall | B01D 61/025 210/321.6 |
| 2007/0283811 A1 | 12/2007 | Wu | |
| 2008/0047426 A1 | 2/2008 | Dolensky | |
| 2010/0326275 A1 | 12/2010 | Sechrist | |
| 2012/0324938 A1 * | 12/2012 | Yoon | B01D 35/153 62/331 |
| 2014/0061112 A1 * | 3/2014 | Burd | C02F 1/006 210/234 |
| 2015/0001140 A1 * | 1/2015 | Reckin | B01D 27/08 210/136 |
| 2016/0023155 A1 * | 1/2016 | Ramkumar | B01D 53/047 95/22 |
| 2016/0214041 A1 * | 7/2016 | Miller | B01D 35/04 |
| 2019/0360435 A1 * | 11/2019 | Brand | F02M 25/0836 |

\* cited by examiner

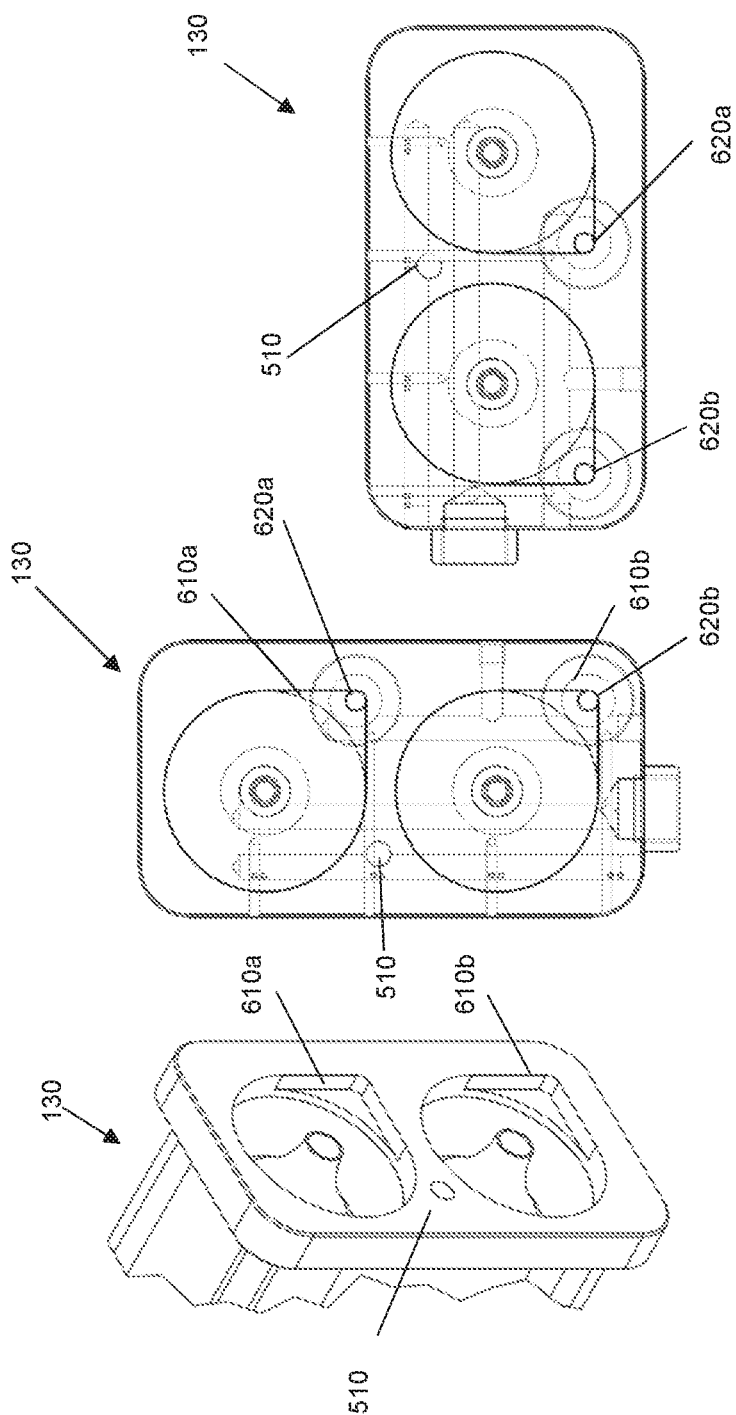

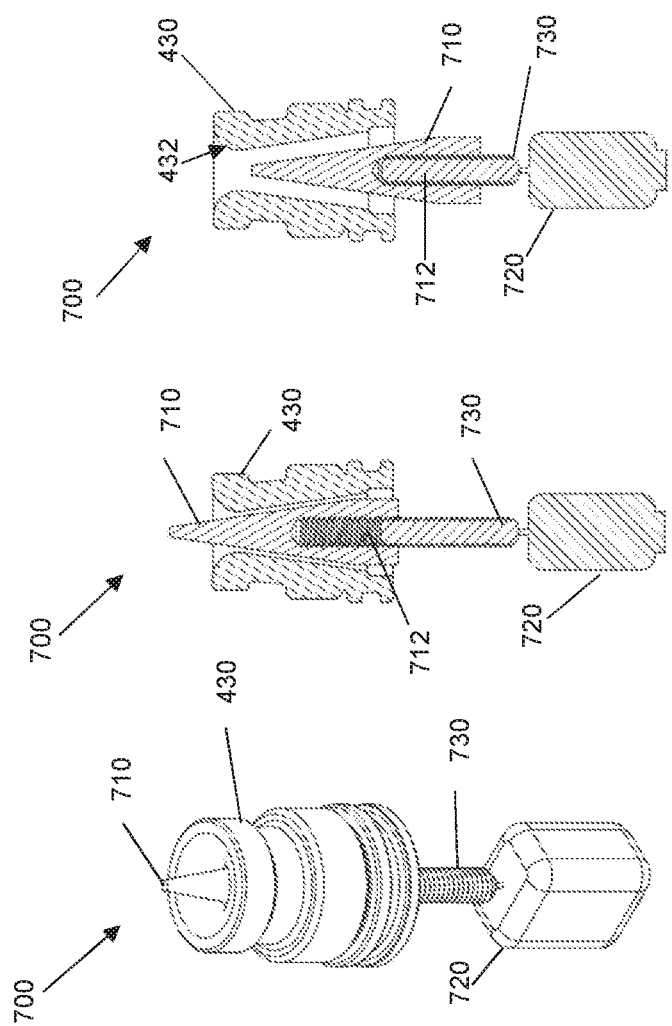

DUAL FILTER FOR MOISTURE REMOVAL FROM A FLUID FLOW

CROSS-REFERENCE TO RELATED APPLICATIONS

This application is a U.S. national stage application under 35 U.S.C. § 371 of PCT Application No. PCT/GB2015/053535, filed Nov. 19, 2015, which claims priority to United Kingdom Patent Application No. 1500189.4, filed Jan. 7, 2015, the entireties of which are incorporated herein by reference.

TECHNICAL FIELD

The embodiments described below relate to fluid control systems and more particularly, to filters.

BACKGROUND

Equipment typically employ fluids such as clean dry air (CDA) to perform various functions in different industries. In the rail industry, rail cars can employ CDA to operate pneumatic systems. The pneumatic systems can control parts that perform the various functions on the rail cars. For example, the pneumatic system may control brakes to stop the rail car. In the semiconductor industry, manufacturing equipment often employ pressurized CDA to operate valves to open and close ports. For example, multi-chamber wafer processing equipment utilizes the ports to isolate each chamber from a central platform while still allowing a robot on the central platform to place and remove a wafer in the chamber. These are just exemplary industries and do not limit the scope of this application.

It is desirable that the CDA (or other appropriate fluid) not adversely affect the parts in the equipment. To ensure that the CDA does not adversely affect the parts, the CDA should be substantially free of moisture and other undesirable components such as particulates. CDA that is free of the moisture and other undesirable components is less likely to cause corrosion or other adverse effects on the pneumatic system or components. For example, reducing the number of particulates can reduce the wear of moving components, such as valves, in the pneumatic system. Reducing the adverse effects on a pneumatic system may extend the operating life of the pneumatic equipment.

Filters are often employed to remove one or more components from the fluid. For example, some filters, sometime referred to as dryers, are specifically adapted to remove moisture from compressed air to provide CDA to the pneumatic system. The filters are also employed in situ by the equipment because it may not be feasible to store CDA. More specifically, the filter receives compressed air from a source, filters the air, and provides CDA to the equipment as the equipment requires (e.g., when the pneumatic system is controlling the equipment). Sometimes, the equipment will compress air from the environment and provide it to the filters. Many of these filters employ desiccant beads or membranes to adsorb the moisture from the air. By employing the filters in situ, the equipment may obtain CDA while in operation.

However, the filters may have undesirable characteristics that are not compatible with being employed in situ by the equipment. For example, operating ranges of the filters may be undesirably narrow. In particular, the filtering media in the filters may require a narrow fluid flow rate which may render the filtering media unsuitable for equipment that may require a wide range of fluid flow rates. A wider operating range for the filters would allow a filter to be used in a larger variety of equipment. Also, the filters may not reliably adsorb moisture from the air unless the filters are oriented in a desired manner. For example, in filters that employ desiccant beads, the air may bypass the desiccant beads if the filters are not oriented vertically. This may prevent use of the desiccant bead filters in equipment that changes orientation during operation.

The filters also typically require frequent planned maintenance which leads to equipment downtime. For example, the filters may require replacement more frequently than the other parts in the equipment. In other words, the frequency of the planned equipment downtime may be dictated by the filters rather than the service life of the parts in the equipment. It has also been found that the filters may be prone to failure thereby causing unexpected equipment downtime. For example, the filters may become unexpectedly saturated with moisture. The saturation may cause an undesirable pressure drop or increase in the amount of moisture in the CDA provided to the equipment. Unexpected pressure drops in the CDA supplied by the filter can cause the pneumatic system to cease functioning thereby causing parts in the equipment to not function. In filters that employ desiccant beads, the beads are prone to degrading and creating particulates due to vibration of the beads. The particulates may be carried by the CDA to the equipment. The particulates may also obstruct the air flow through the filter.

Equipment downtime, particularly downtime associated with sophisticated equipment automated by pneumatic systems, is very costly. For example, rail cars not being used to transport cargo while filters are being replaced can have opportunity costs that range from hundreds to several thousands of dollars an hour. Even seemingly modest improvements in reducing equipment downtime can result is considerable savings when the same improvements are employed over hundreds or thousands of similarly situated pieces of equipment. Moreover, unexpected downtime of the equipment can result in large scale disruptions such as shutting down a manufacturing facility or rail systems. Hence, significant financial benefits may be realized by reducing equipment downtime.

What is needed, therefore, is a more reliable filter. There is also a need for a filter that can operate continuously and without maintenance.

SUMMARY

A dual filter for removing one or more components from a fluid flow is provided. According to an embodiment, the dual filter comprises a first filter media and a second filter media respectively disposed in a first conduit and a second conduit. The dual filter further comprises at least one manifold coupled to a pair of openings of the conduits wherein the at least one manifold is adapted to monitor and control the fluid flow through one of the filter media.

A method of forming a dual filter for removing one or more components from a fluid flow is provided. According to an embodiment, the method comprises forming and respectively disposing a first filter media and a second filter media in a first conduit and a second conduit. The method further comprises forming and coupling at least one manifold to a pair of openings of the conduits, and adapting the at least one manifold to monitor and control the fluid flow through one of the filter media.

A method of filtering a fluid flow with a dual filter is provided. According to an embodiment, the method comprises monitoring and controlling a fluid flow through at least two filter media with at least one manifold adapted to direct fluid flow to one of the at least two filter media based on a property of the filtered fluid flow from the at least one of the two filter media.

ASPECTS

According to an aspect, a dual filter (100) for removing one or more components from a fluid flow comprises a first filter media (112a) and a second filter media (112b) respectively disposed in a first conduit (114a) and a second conduit (114b), and at least one manifold (120, 130) coupled to a pair of openings (116a,b) of the conduits (114a, b) wherein the at least one manifold (120, 130) is adapted to monitor and control the fluid flow through one of the filter media (112a, b).

Preferably, the dual filter (100) is further adapted to purge the filter media (112a,b) based on a performance criteria.

Preferably, the dual filter (100) is further adapted to control a fluid flow rate through the filter media (112a,b) based on a fluid property.

Preferably, the dual filter (100) is further adapted to direct purge flow through the filter media (112a,b) not receiving the fluid flow.

Preferably, the dual filter (100) is further adapted to remove the one or more components from the fluid flow in any dual filter (100) orientation.

Preferably, the dual filter (100) further comprises a controller (310) adapted to control the fluid flow based on a criteria.

Preferably, the dual filter (100) further comprises a controller (310) adapted to monitor a property of the fluid flow.

Preferably, the at least one manifold (120) further comprises valves (350a-d) adapted to direct the fluid flow to one of the filter media (112a,b) while controlling a purge flow from another of the filter media (112a,b).

Preferably, the at least one manifold (130) comprises a nozzle (430) adapted to control a fluid flow rate through the filter media (112a,b).

Preferably, the at least one manifold (120) comprises a plurality of exhaust ports (128) fluidly coupled to filter media (112a,b).

Preferably, the at least one manifold (120) comprises one or more drain recesses (610a,b) and a plurality of purge drain holes (620a,b) configured to drain fluid from the manifolds (120) in at least two orientations.

Preferably, the at least one manifold (130) further comprises a check valve (410) adapted to direct the fluid flow from one of the filter media (112a,b) to valves (350a-d) that control the fluid flow.

Preferably, the at least one manifold (120) comprises:
an inlet manifold (120) that directs the fluid flow to one of the filter media (112a,b); and
an outlet manifold (130) that diverts fluid flow from the filter media (112a,b) to provide pilot fluid to the inlet manifold (120).

Preferably, the at least one manifold (120) comprises:
an inlet manifold (120) that directs the fluid flow to one of the filter media (112a,b); and
an outlet manifold (130) that diverts fluid flow from the one of the filter media (112a,b) to purge another of the filter media (112a,b).

Preferably, the dual filter (100) further comprises of one or more two-way diffuser-concentrators (118) adapted to diffuse the fluid flow to the filter media (112a,b) and concentrate the fluid flow from the filter media (112a,b).

Preferably, the two-way diffuser-concentrators (118) are further adapted to hold the filter media (112a,b) in the conduits (114a,b).

Preferably, the two-way diffuser-concentrators (118) are conical.

Preferably, the two-way diffuser-concentrators (118) are comprised of at least an inner diffuser-concentrator (118a) and an outer diffuser-concentrator (118c).

Preferably, the dual filter (100) further comprises one or more porous retaining discs (119) disposed between the filter media (112a,b) and the at least one manifold (120, 130) to retain the filter media (112a,b).

Preferably, the conduits (114a,b) are in a housing (110) that further includes a pilot channel (510) that carries pilot fluid from an outlet manifold (130) to an inlet manifold (120).

Preferably, the dual filter (100) further comprises a heater (360) adapted to heat the filter media (112a,b) to reduce the purge time of the filter media (112a,b).

According to an aspect, a method of forming a dual filter (100) for removing one or more components from a fluid flow comprises forming and respectively disposing a first filter media (112a) and a second filter media (112b) in a first conduit (114a) and a second conduit (114b), forming and coupling at least one manifold (120, 130) to a pair of openings (116a,b) of the conduits (114a, b), and adapting the at least one manifold (120, 130) to monitor and control the fluid flow through one of the filter media (112a,b).

Preferably, the method of adapting the at least one manifold (120, 130) to monitor and control the fluid flow through one of the filter media (112a,b) comprises adapting the dual filter (100) to purge the filter media (112a,b) based on a performance criteria.

Preferably, the method of adapting the at least one manifold (120, 130) to monitor and control the fluid flow through one of the filter media (112a,b) comprises adapting the dual filter (100) to control a fluid flow rate through the filter media (112a,b) based on a fluid property.

Preferably, the method of adapting the at least one manifold (120, 130) to monitor and control the fluid flow through one of the filter media (112a,b) comprises adapting the dual filter (100) to direct purge flow through the filter media (112a,b) not receiving the fluid flow.

Preferably, the method of adapting the at least one manifold (120, 130) to monitor and control the fluid flow through one of the filter media (112a,b) further adapted to remove the one or more components from the fluid flow in any dual filter (100) orientation.

Preferably, the method of forming the dual filter (100) comprises forming and adapting a controller (310) to control the fluid flow based on a criteria.

Preferably, the method of forming the dual filter (100) comprises forming and adapting a controller (310) to monitor a property of the fluid flow.

Preferably, the method of forming the at least one manifold (120) further comprises forming and adapting valves (350a-d) to direct the fluid flow through one of the filter media (112a,b) while directing a purge flow from another of the filter media (112a,b).

Preferably, the method of forming the at least one manifold (130) comprises forming and adapting a nozzle (430) to control a fluid flow rate through the filter media (112a,b).

Preferably, the method of forming the at least one manifold (120) comprises forming a plurality of exhaust ports (128) fluidly coupled to the filter media (112a,b).

Preferably, the method of forming the at least one manifold (120) comprises forming and configuring one or more drain recesses (610*a,b*) and a plurality of purge drain holes (620*a,b*) to drain fluid from the at least one manifold (120) in at least two orientations.

Preferably, the method of forming at least one manifold (130) comprises forming and adapting a check valve (410) redirect a portion of the fluid flow from one of the filter media (112*a,b*) to valves (350*a-d*) that control the fluid flow.

Preferably, the method of forming the at least one manifold (120) comprises forming an inlet manifold (120) that directs the fluid flow to one of the filter media (112*a,b*), and forming an outlet manifold (130) that diverts fluid flow from the filter media (112*a,b*) to the inlet manifold (120) to control the fluid flow.

Preferably, the method of forming the at least one manifold (120) comprises forming an inlet manifold (120) that directs the fluid flow to one of the filter media (112*a,b*), and forming an outlet manifold (130) that diverts fluid flow from the one of the filter media (112*a,b*) to purge another of the filter media (112*a,b*).

Preferably, the method of forming the dual filter (100) comprises forming and adapting one or more two-way diffuser-concentrators (118) to diffuse the fluid flow to the filter media (112*a,b*) and concentrate the fluid flow from the filter media (112*a,b*).

Preferably, the forming the two-way diffuser-concentrators (118) comprises forming two at least an inner (118*a*) and an outer diffuser-concentrator (118*c*).

Preferably, the method of forming the two-way diffuser-concentrators (118) further comprises adapting the two-way diffuser-concentrators (118) to hold the filter media (112*a,b*) in the conduits (114*a,b*).

Preferably, the method of forming the two-way diffuser-concentrators (118) comprises forming conical two-way diffuser-concentrators (118).

Preferably, the method of forming the dual filter (100) further comprises forming and disposing one or more porous retaining discs (119) between the filter media (112*a,b*) and the at least one manifold (120, 130) to retain the filter media (112*a,b*).

Preferably, the method of forming the conduits (114*a,b*) comprises forming a pilot channel (510) that carries the fluid flow from an outlet manifold (130) to an inlet manifold (120).

Preferably, the method of forming the dual filter (100) further comprises forming and adapting a heater (360) to heat the filter media (112*a,b*) to reduce the purge time of the filter media (112*a,b*).

According to an aspect, a method of filtering a fluid flow with a dual filter (100), the method comprises monitoring and controlling a fluid flow through at least two filter media (112*a,b*) with at least one manifold (120) adapted to direct fluid flow to one of the at least two filter media (112*a,b*) based on a property of the filtered fluid flow from the one of the two filter media (112*a,b*).

Preferably, the method of filtering the fluid flow with the dual filter (100) further comprises diverting some of the filtered fluid flow from the one of the at least two filter media (112*a,b*) to purge another of the at least two filter media (112*a,b*).

Preferably, the method of filtering the fluid flow with the dual filter (100) further comprises diverting some of the filtered fluid flow from the one of the at least two filter media (112*a,b*) to provide pilot fluid to the at least one manifold (120, 130) to control the fluid flow.

Preferably, the method of filtering the fluid flow with the dual filter (100) further comprises switching the fluid flow from the one of the at least two filter media (112*a,b*) to another of the at least two filter media (112*a,b*) with the at least one manifold (120, 130) based on a fluid flow property.

BRIEF DESCRIPTION OF THE DRAWINGS

The same reference number represents the same element on all drawings. It should be understood that the drawings are not necessarily to scale.

FIGS. 6*a-c* shows a perspective sectional view and two orthogonal sectional views of the inlet manifold 120 according to an embodiment.

FIGS. 7*a*-7*c* show views of a variable nozzle assembly 700 according to an embodiment.

DETAILED DESCRIPTION

FIGS. 1-7*c* and the following description depict specific examples to teach those skilled in the art how to make and use the best mode of embodiments of a dual filter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the dual filter. As a result, the embodiments described below are not limited to the specific examples described below, but only by the claims and their equivalents.

The dual filter described in the following embodiments is more reliable than prior art filters. The dual filter is also able to operate continuously and without maintenance. The dual filter employs a dual filter media configuration that filters fluid with one of the filter media while the other filter media is being purged. The dual filter is able to monitor the fluid properties, parameters such as the number of purges on the filter media, and control the fluid flow. The dual filter alternates the fluid and the purge flow between the filters. The dual filter is also able to divert filtered fluid from one of the filter media to purge the other filter media. The filtered fluid flow can also be used to actuate valves in the dual filter so switch the fluid flow from one filter media to the other filter media. This alternating or switch of the fluid and purge flows allows the dual filter to operate continuously and without maintenance as well as automatically control the fluid flow to meet desired criteria and fluid flow properties.

Figure 1:
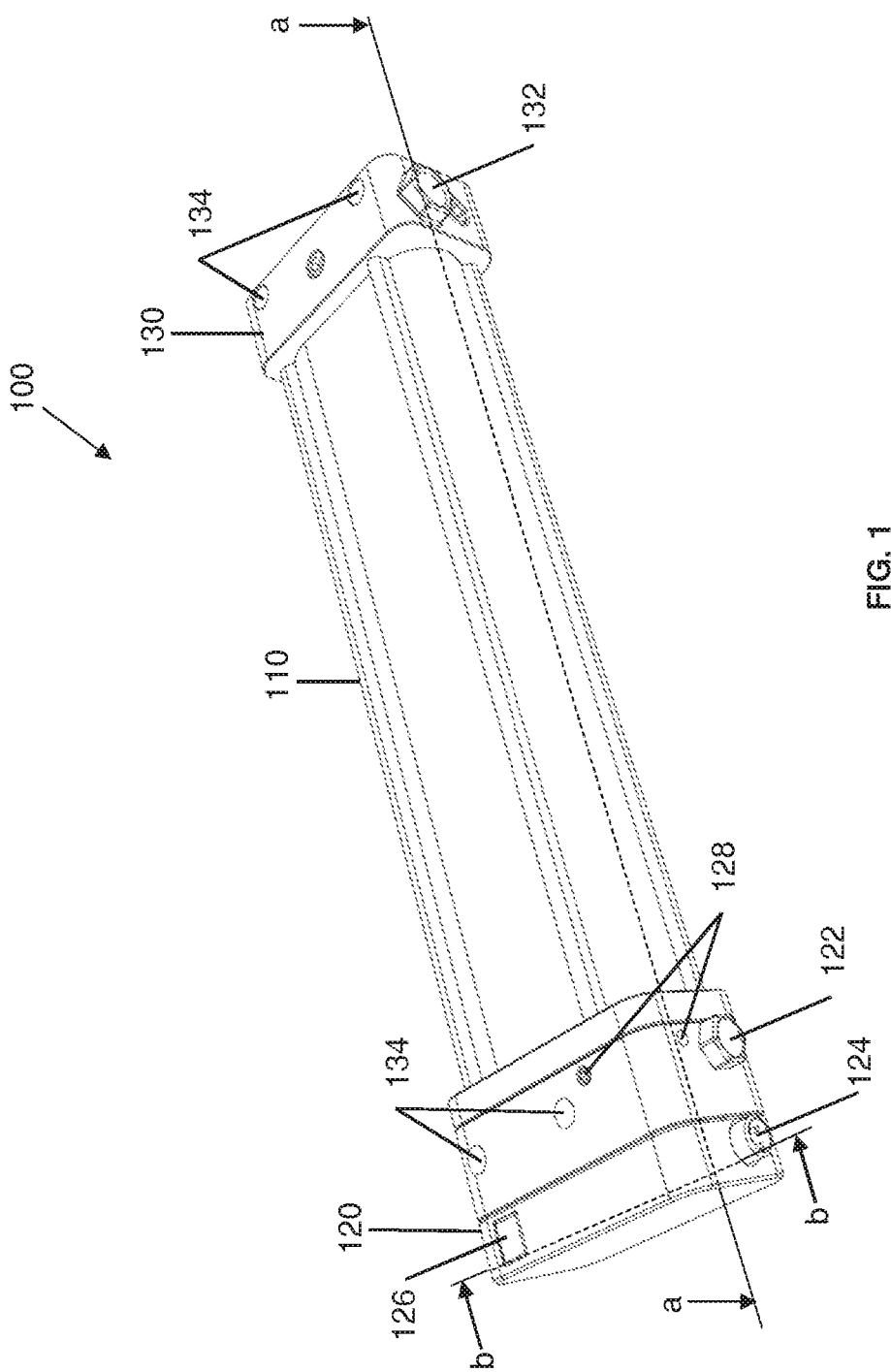
FIG. 1 shows a perspective view of a dual filter 100 according to an embodiment.

FIG. 1 shows a perspective view of a dual filter 100 according to an embodiment. The dual filter 100 is shown as having housing 110 that is coupled to an inlet manifold 120 and an outlet manifold 130. The housing 110, the inlet manifold 120, and the outlet manifold 130 may be comprised of aluminum that is resistant to corrosion, although any suitable material may be employed. The material in the inlet manifold 120 is likely to be exposed to undesirable components, such as water, which can cause corrosion or other damage to inappropriately selected material. The fluid leaving the housing 110 will have undesirable components removed. Therefore, the outlet manifold 130 can be formed from materials that are not the same as the materials used to form the inlet manifold 120. Manufacturing costs can also be considered in forming the housing 110, the inlet manifold 120, and the outlet manifold 130. For example, the housing 110 is shown as formed from extruded aluminum and cut into appropriate lengths. The filter media and the internal portions of the housing 110 will be described in more detail in the with reference to FIG. 2.

Still referring to FIG. 1, the inlet manifold 120 has an inlet 122 that is adapted to receive fluid flow, such as air with moisture, from a pressure source. The inlet manifold 120 also includes a communications port 124 that can be accessed by a user to control or program the dual filter 100. The inlet manifold 120 is shown with a display 126 that can show information such as the temperature, dew point suppression, and the number of purge cycles for a filter media. The user may use the information on the display 126 to determine the properties of the fluid flow, set criteria for monitoring and controlling the fluid flow or the like. The user may set criteria for the monitoring and controlling the fluid flow via the communications port 124. The inlet manifold 120 is also shown with exhaust ports 128. The exhaust ports 128 allow purge fluid flow to exit the inlet manifold 120.

The outlet manifold 130 is adapted to receive and direct the fluid flow from the housing 110 to an outlet 132. The fluid flow from the outlet 132 is filtered by the filtering media. The outlet manifold 130 can also include one or more bolt holes 134 that can be used to couple the dual filter 100 to, for example, equipment that is supplied by the filtered fluid flow from the dual filter 100.

Figure 2:
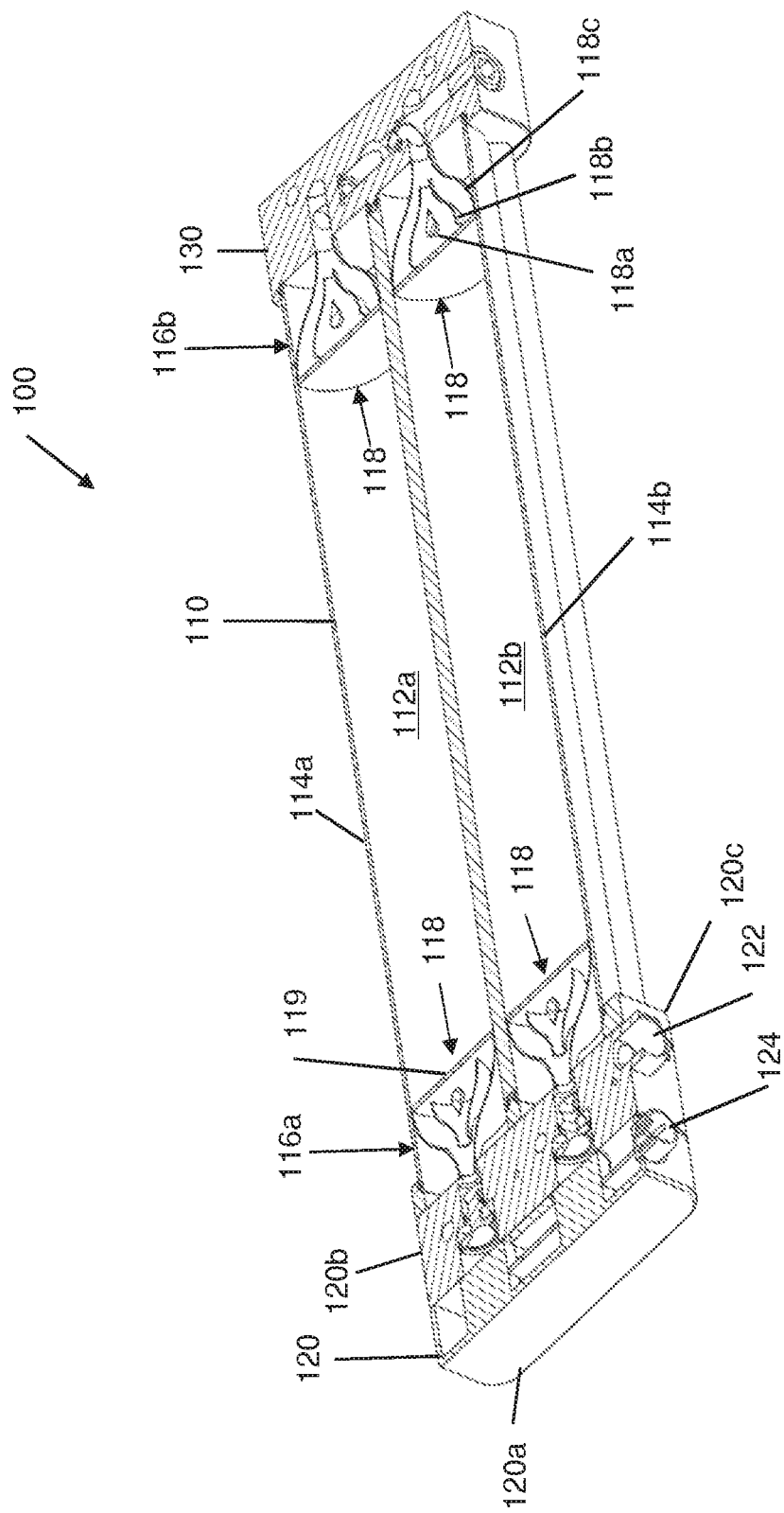
FIG. 2 shows a perspective sectional view of the dual filter 100 according to an embodiment.
Figure 3:
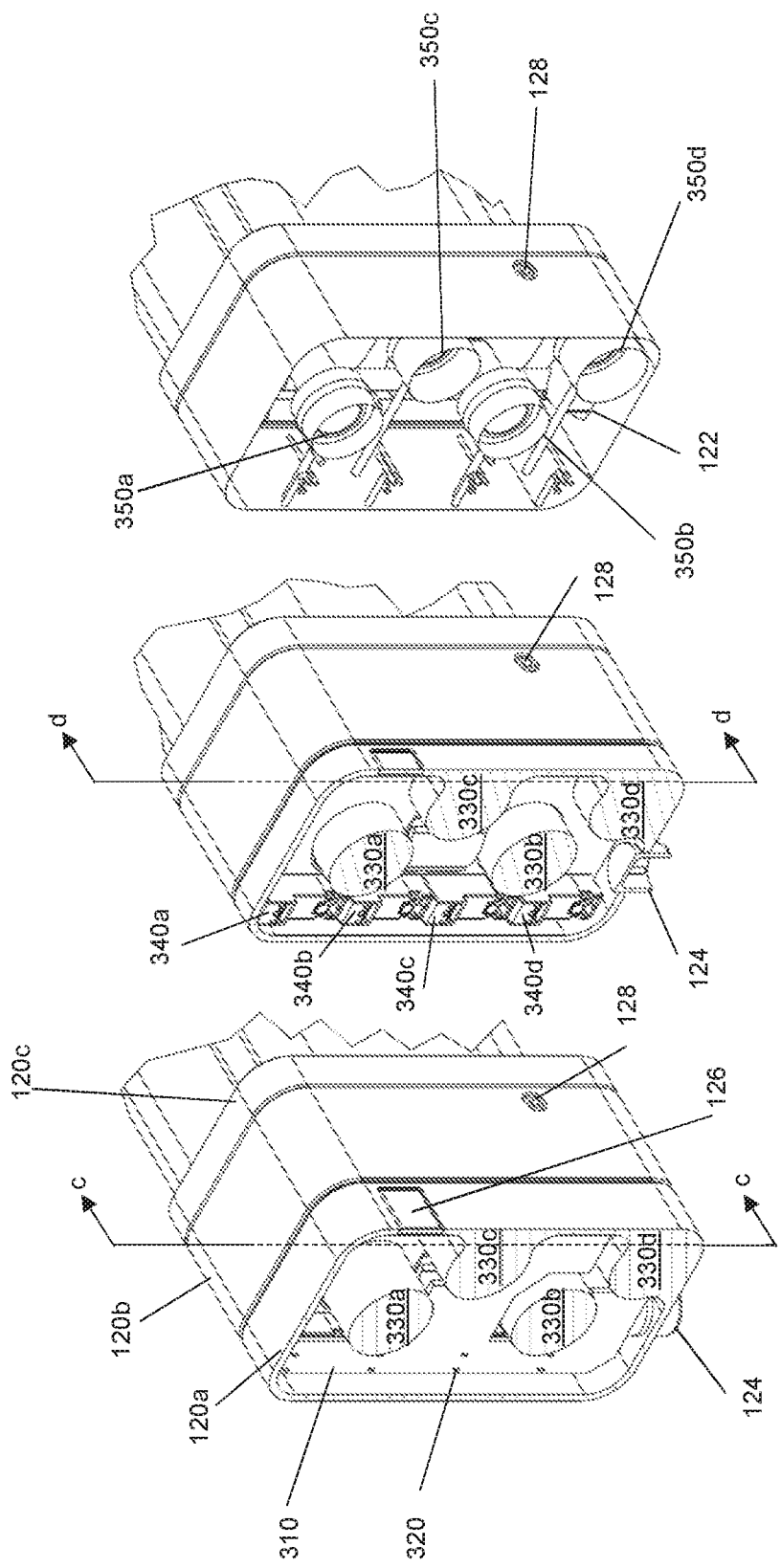
FIGS. 3*a*-3*c* show perspective views of the inlet manifold 120 according to an embodiment.

FIG. 2 shows a perspective sectional view of the dual filter 100 according to an embodiment. The housing 110 is shown as including two filter media 112*a,b* that are disposed in two conduits 114*a,b*. The two conduits 114*a,b* extend between a first pair of openings 116*a* and a second pair of openings 116*b*. The housing 110 also has four two-way diffuser-concentrators 118 that are between the filter media 112*a,b* and the inlet manifold 120 and the outlet manifold 130 near the opening pairs 116*a,b*. The inlet manifold 120 can also include sections 120*a-c*. Retaining discs 119 are disposed between the two-way diffuser-concentrators 118 and the filter media 112*a,b*.

The filter media 112*a,b* are adsorbent media tubes (AMT) although any suitable material that removes one or more components from the fluid flow may be employed. The filter media 112*a,b* are shown as cylindrical in shape. In the embodiment shown, the filter media 112*a,b* adsorbs moisture from the fluid flow. Although any suitable filter media may be used, an advantage of using AMT is that moisture may be adsorbed in any orientation unlike, for example, desiccant beads. The AMT also has advantages over other filters, such as membrane dryers, due to greater resistance to vibration and ability to function at lower temperatures. The AMT can also be employed indefinitely without being discarded as long as the AMT is purged. Purging the filter media 112*a,b* so it may continue to remove undesired components from the fluid flow is sometimes referred to as regenerating the filter.

The conduits 114*a,b* hold the filter media 112*a,b* in a dual tube configuration. The dual tube configuration of the filter media 112*a,b* allows fluid flow through one of the filter media 112*a,b* while the other filter media 112*a,b* is purged. As discussed in the foregoing, the opening pairs 116*a,b* are at each end of the conduits 114*a,b*. The opening pairs 116*a,b* allow the fluid flow to be segregated by the inlet manifold 120 and the outlet manifold 130. The opening pairs 116*a,b* also allow the diffusion and concentration of the fluid flow, as will be described in more detail in the following.

The two-way diffuser-concentrators 118 are adapted to diffuse the fluid flowing to the filter media 112*a,b*. The two-way diffuser-concentrators 118 are also adapted to concentrate the fluid flowing from the filter media 112*a,b*. As can be seen, the two-way diffuser-concentrators 118 are arranged in a concentric manner. That is, there is an inner 118*a*, a middle 118*b*, and an outer 118*c* diffuser-concentrator. Although three concentric diffuser-concentrators are shown, more or fewer may be employed in alternative embodiments. The two-way diffuser-concentrators 118 are adapted to hold the filter media 112*a,b* in in the conduits 114*a,b*. The retaining discs 119 may be pressed into the filter media 112*a,b* by the two-way diffuser-concentrators 118 to hold the filter media 112*a,b*. The two-way diffuser-concentrators 118 can also include openings that allow fluid to flow out of the diffuser-concentrators 118. The openings may be proximate the retaining discs 119. In the embodiment shown, the two-way diffuser-concentrators 118 have a conical shape. However, different shapes may be employed in alternative embodiments. The shape of the two-way diffuser-concentrators 118 diffuses the fluid flow to the filter media 112*a,b* which may increase the time between purging the filter media 112*a,b*. The shape of the two-way diffuser-concentrators 118 also concentrates fluid flow from the filter media 112*a,b* without causing an undesired pressure drop in the fluid flow. Accordingly, the filter media 112*a,b* may be uniformly utilized thereby increasing, for example, the time between purging and adsorption rate of the filter media 112*a,b*.

FIGS. 3*a*-3*c* show perspective sectional views of the inlet manifold 120 according to an embodiment. FIG. 3*a* shows the inlet manifold 120 taken at b-b in FIG. 1. FIGS. 3*b* and 3*c* show perspective sectional views taken at c-c and d-d in FIGS. 3*a* and 3*b*, respectively. FIG. 3*c* is a sectional perspective view of the inlet manifold 120 where the body of the inlet manifold 120 is shown transparent for clarity when described internal components.

The inlet manifold 120 is shown with the inlet 122, the control connector 124, and the display 126 described with reference to FIG. 1. The inlet manifold 120 is also shown with a controller 310 that is coupled to the control connector 124. The controller 310 is coupled to pins 320 that are electrical connectors for solenoids 340*a-d* shown in FIG. 3*b*. The inlet manifold 120 also includes valve housings 330*a-d* that cover valves 350*a-d* shown in FIG. 3*c*. With reference to FIG. 3*b*, the inlet manifold 120 is shown as having four solenoids 340*a-d*, although more or fewer may be employed. The solenoids 340*a-d* actuate the valves 350*a-d* enclosed in the valve housings 330*a-d*. The inlet manifold 120 also includes a heater 360 that is coupled to the inlet manifold 120. The heater 360 is also electrically coupled to the controller 310.

The controller 310 is adapted to monitor and control the fluid flow with one of the manifolds 120, 130. For example, in the embodiment shown, the controller 310 monitors the dew point suppression of the fluid flow. Based on the dew point suppression, the controller 310 can control the inlet manifold 120 and the outlet manifold 130 to switch the flow from one of the filter media 112*a,b* to the other filter media 112*a,b*. The controller 310 can also control the fluid flow rate through the filter media 112*a,b* based on properties of the fluid. For example, the controller 310 may monitor the humidity and temperature of the fluid flow leaving the filter media 112*a,b* and reduce the fluid flow rate so that the fluid spends more time in the filter media 112*a,b*. Accordingly, the humidity of the fluid flow leaving the filter media 112a,b may be reduced. The controller 310 can also display data, such as the dew point suppression of the fluid or the number of purge cycles performed, on the display 126. The controller 310 is adapted to electrically actuate the solenoids 340a,b which, in turn, control the valves 350a-d to direct the fluid flow through filter media 112a,b.

The valves 350a-d are adapted to direct the fluid flow to and from the filter media 112a,b. Although the valves 350a-d are poppet valves, any appropriate valve may be employed. For example, the valves 350a-d may be variable fluid flow control valves. As shown, two of the valves 350a-d (referred to as inlet valves 350a,b) are fluidly coupled to the inlet 122. The first inlet valve 350a may therefore selectively and fluidly couple the inlet 122 with the first filter media 112a. Similarly the second inlet valve 350b is adapted to selectively and fluidly couple the inlet 122 with the second filter media 112b. The inlet valves 350a,b can open and close to allow fluid flow from the inlet 122 to the first filter or second media 112a or 112b, respectively. For example, if the first inlet valve 350a is open and the second inlet valve 350b is closed, then fluid will flow from the inlet 122 to the first filter media 112a.

The other two of the valves 350a-d (referred to as exhaust valves 350c,d) are fluidly coupled to the one or more exhaust ports 128. Accordingly, purge flow from the filter media 112a,b may flow out of the inlet manifold 120 via the one or more exhaust ports 128. Similar to the inlet valves 350a,b, the exhaust valves 350c,d may open and close to allow purge flow from the first filter media 112a or the second filter media 112b. For example, if the second exhaust valve 350b is open and the first exhaust valve 350a is closed, then the purge fluid will flow from the second filter media 112b. The exhaust valves 350c,d can also control the purge time of the filter media 112a,b. For example, the exhaust valves 350c,d will close to stop the purge flow through their respective filter media 112a,b. The exhaust valves 350c,d can close based on, for example, the time required to purge the filter media 112a,b or humidity of the purge flow exiting the filter media 112a,b. When the purge is flowing from the filter media 112a,b, the inlet manifold 120 directs the purge flow to the exhaust ports 128. The user may select which of the one or more exhaust ports 128 is used to allow fluid flow from the inlet manifold by opening an exhaust port 128. More than one of the exhaust ports 128 may be opened 128. In addition, a silencer (not shown) may be attached to the one or more exhaust ports 128 in alternative embodiments.

An inlet and outlet pair of the valves 350a-d are associated with each of the filter media 112a,b. For example, the first valve pair 350a,c is associated with the first media 112a. The second valve pair 350b,d is associated with the second filter media 112b. As shown the first valve pair 350a,c open and close to direct fluid flow to or from the first filter media 112a,b. More specifically, the first inlet valve 350a may be open while the first exhaust valve 350c is closed to allow fluid flow from the inlet 122 to the first filter media 112a. While fluid is flowing from the inlet 122 to the first filter media 112a, the second valve pair 350c,d can direct purge flow from the second media 112b to the exhaust 128. More specifically, the second inlet valve 350b is closed and the second outlet valve 350d is open. The purge fluid flow from the second filter media 112b may therefore be directed to the exhaust ports 128. Accordingly, the inlet manifold 120 may control the fluid flow through the filter media 112a,b to the outlet manifold 130.

The heater 360 is adapted to heat the inlet manifold 120. Although one heater 360 is shown in the inlet manifold 120, more than one heater 360 may be employed in alternative embodiments. Additionally or alternatively, the heater 360 may also be disposed in the housing 110 or the outlet manifold 130. The heater 360 heats the inlet manifold 120 to prevent adverse conditions such as freezing conditions in the inlet manifold 120. Accordingly, the fluids in the valves 350a-d, drain holes (described in the following), or other components do not freeze thereby allowing the valves 350a-d and drain holes to continue to function. The heater 360 also prevents materials in the inlet manifold 120, such as elastomeric seals, from becoming rigid. The heater 360 can be turned on by the controller 310 when low temperatures are detected. The heater 360 can also heat the filter media 112a,b to reduce the time required to purge the filter media 112a,b. The dual filter 100 may therefore monitor and control the fluid in below freezing temperatures.

Figure 4:
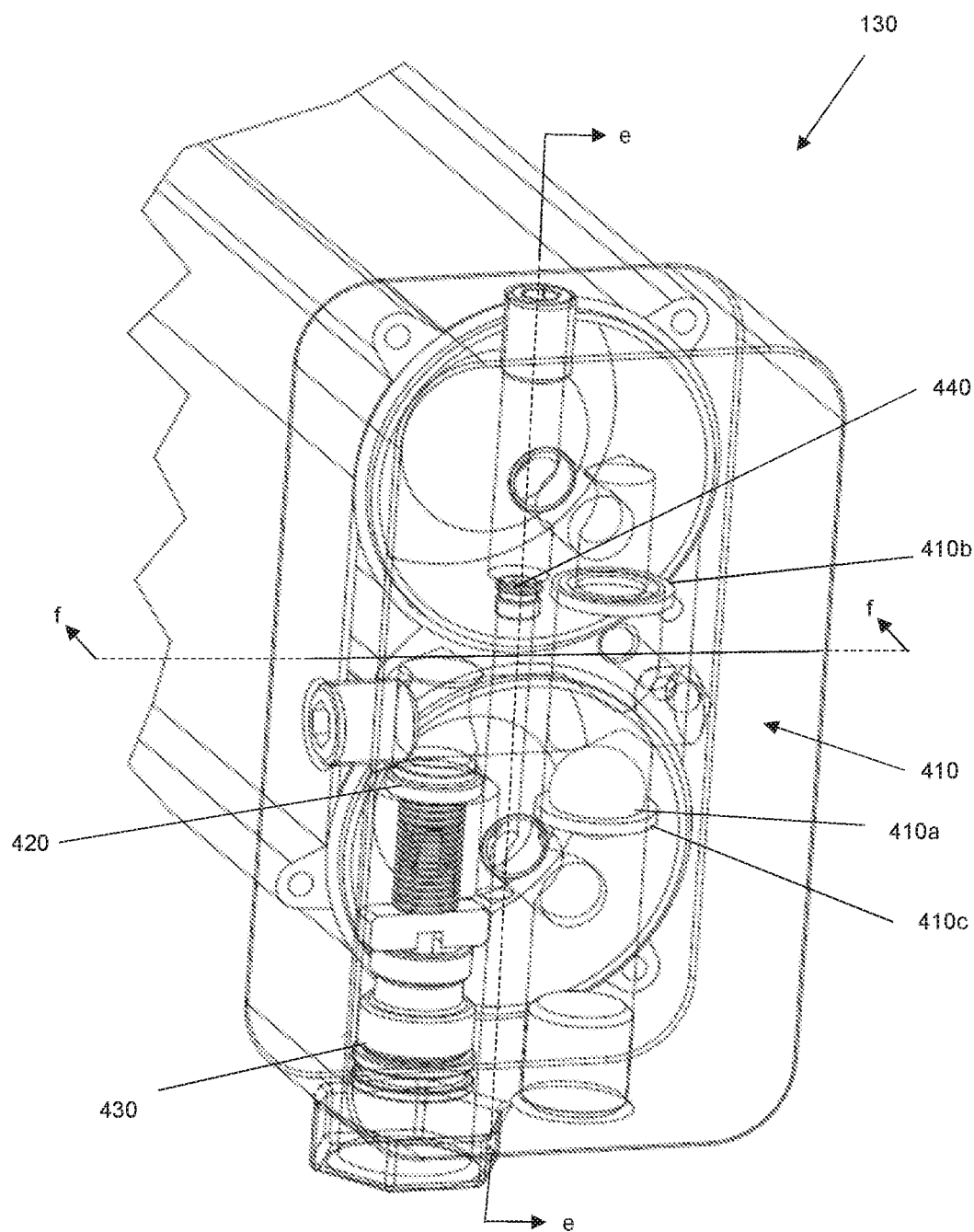
FIG. 4 shows a perspective view of the outlet manifold 130 according to an embodiment.

FIG. 4 shows a perspective view of the outlet manifold 130 according to an embodiment. The outlet manifold 130 is shown with the body of the outlet manifold 130 removed to show internal components for clarity. As shown in FIG. 4, the outlet manifold 130 includes a check valve 410. The check valve 410 has a ball 410a that moves between ball rests 410b,c. The check valve 410 is fluidly coupled to the filter media 112a,b via the first ball rest 410b and to the second filter media 112b via the second ball rest 410c. The outlet manifold 130 further includes a non-return valve 420, a nozzle and a purge orifice 440 that are fluidly coupled to the check valve 410.

The check valve 410 directs filtered fluid flow from the filter media 112a,b towards the non-return valve 420 and the outlet nozzle 430. Additionally, a portion of the fluid flow leaving the one of the filter media 112a,b is also diverted to the other of the filter media 112a,b through a purge orifice 440. This diversion through the purge orifice 440 is described in more detail with reference to FIG. 5. Still referring to FIG. 4, the check valve 410 diverts filtered fluid flow from one of the filter media 112a,b to the other filter media 112a,b. To divert the filtered fluid flow, the ball 410a shuttles between the first ball rest 410b and the second ball rest 410c. As shown, the check valve 410 is pressed against the second ball rest 410c to form a fluid seal that diverts fluid flow from the first filter media 112a to the second filter media 112b which will be described in more detail in the following with reference to FIG. 5. Regardless of the position of the check valve ball 410a, filtered fluid flows to the non-return valve 420 and the outlet nozzle 430.

The non-return valve 420 is adapted to allow the fluid flow to flow from the filter media 112a,b and out of the outlet manifold 130 via the outlet nozzle 430. The non-return valve 420 may be a spring biased poppet valve that opens in response to pressure exerted by the fluid flow from the filter media 112a,b. When there is reverse pressure, such as when there is no fluid flow from the filter media 112a,b, the poppet will prevent air from entering the outlet manifold 130 via the outlet nozzle 430. The outlet nozzle 430 is adapted to control the fluid flow rate out of the outlet manifold 130 by restricting the flow rate of the fluid. In alternative embodiments, the nozzle 430 may be replaced by an alternative valve with a poppet or spool configuration. The alternative valve may be driven by a solenoid, voice-coil, a stepper motor or the like. The nozzle 430 is described in more detail in the following with reference to FIGS. 7a-7c. As discussed in the foregoing, some of the filtered fluid flow in the outlet 130 is diverted to the purge orifice 440.

The purge orifice 440 limits the flow rate of the fluid flow used to purge one of the filter media 112a,b. In the embodiment shown, a portion of the fluid flow from the first filter media 112a is diverted through the purge orifice 440 to purge the second filter media 112b. The use of fluid flow from the filter media 112a,b to purge the filter media 112a,b may be desirable because the fluid flow is filtered and readily available. For example, if the fluid flow is air with moisture, the purge flow will be CDA. The fluid flow rate through the filter media 112a,b may determine the purging time of the filter media 112a,b. The purge orifice 440 may be sized to minimize the amount of fluid flow that is diverted to purge the filter media 112a,b so as to provide the desire fluid flow rate to the user. In alternative embodiments, the purge orifice 440 can be a variable nozzle. That is, the purge fluid flow rate diverted to purge the filter media 112a,b may be regulated by the purge orifice 440. For example, the heater 360 may be adapted to heat the filter media 112a,b to reduce time to purge the filter media 112a,b. The controlled variable purge orifice can therefore decrease the purge fluid flow in response to, for example, an increase in the temperature of the filtered fluid leaving the filter media 112a,b. Accordingly, the purge time of the filter media 112a,b may be controlled (e.g., by the controller 310) while the dual filter 100 is in operation.

Figure 5:
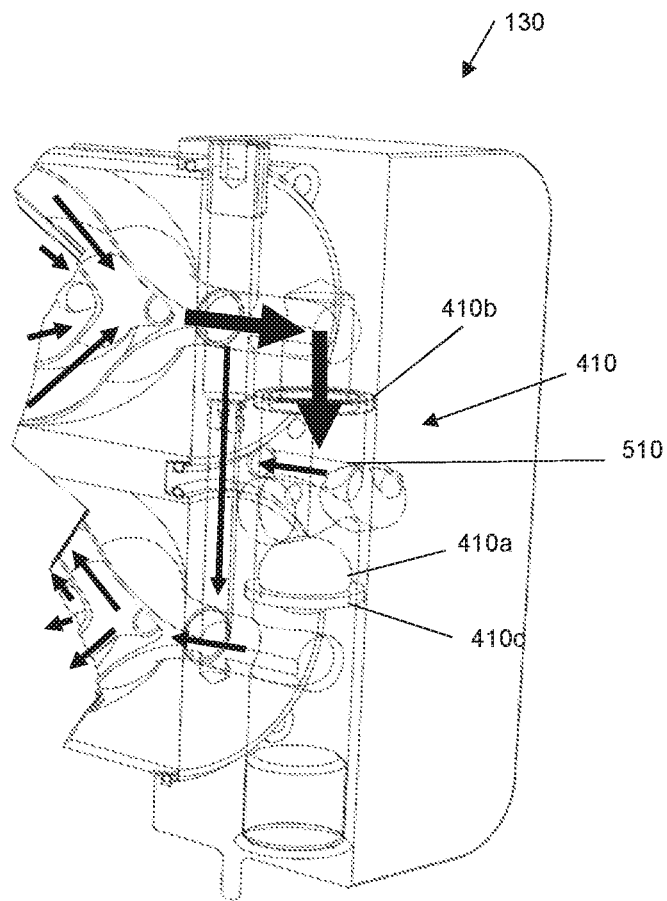
FIG. 5 shows a sectional perspective view of the outlet manifold 130 according to an embodiment.

FIG. 5 shows a sectional perspective view of the outlet manifold 130 according to an embodiment. The sectional view is taken at e-e shown in FIG. 4. FIG. 5 also includes arrows that show the direction of fluid flow through the outlet manifold 130. The size of the arrows is a rough approximation of the volume of fluid flow in the embodiment shown to illustrate the operation of the outlet manifold 130. In alternative embodiments, the fluid flow volume may be in different amounts.

As can be seen from the arrows, filtered fluid flows from the first filter media 112a into the outlet manifold 130. A portion of the filtered fluid flow is diverted to the purge orifice 440. The rest of the filtered fluid flows to the check valve 410. From the check valve 410 a portion is diverted to a pilot channel 510. The pilot channel 510 supplies pilot fluid to the valves 350a-d. The fluid flows through the first filter media 112a due to the valves 350a-d directing the fluid flow through the first filter media 112a as described in the foregoing with reference to FIGS. 3a-c. In either positions of the ball 410a, the fluid flow will be directed through the purge orifice 440 and the pilot channel 510.

The pilot channel 510 provides pilot fluid to the solenoids 340a-d in the inlet manifold. As discussed in the foregoing, the pilot fluid supplied to the solenoids 340a-d is filtered and therefore may be used to actuate the valves 350a-d without causing damage or reducing the operating life of the solenoids 340a-d or the valves 350a-d. When the valves 350a,b in the inlet manifold 120 are actuated to re-direct the fluid flow through the second filter media 112b, the ball 410a will shuttle to the first ball seat 410b. Regardless of which filter media 112a,b the fluid is flowing from, the filtered fluid will flow through the purge orifice 440 and the pilot channel 510.

Although the pilot channel 510 carries filtered fluid, the fluid entering the inlet manifold 122 is not filtered. The inlet manifold 120 may therefore be exposed to undesirable components such as water. In addition, purging the filter media 112a,b pushes undesirable components into the inlet manifold 120. The following describes how these undesirable components are removed from the inlet manifold 120.

FIGS. 6a-c shows a perspective sectional view and two orthogonal sectional views of the inlet manifold 120 according to an embodiment. The inlet manifold 120 includes drain recesses 610a,b adapted to funnel fluid to drain holes 620a,b. Also shown is the pilot channel 510 that fluidly couples filtered fluid from the filter media 112a,b to the inlet manifold 120. The drain recesses 610a,b shown in FIG. 6 are two triangular shaped recesses although any suitable shape or number of drain recesses 610a,b may be employed. The shape of the drain recesses 610a,b funnels fluid to the drain holes 620a,b. The drain holes 620a,b are adapted to drain the fluid away from the drain recesses 610a,b in the two orientations shown in FIGS. 6b and 6c. As can be seen, the fluid will flow to the drain holes 620a,b in both of the orientations. Although only two orientations are shown in FIGS. 6b and 6c, the drain holes 620a,b are also adapted to drain the fluid when the dual filter 100 in other orientations, such as a vertical orientation, that are not shown. The dual filter 100 may therefore be oriented in a variety of different directions while continuously filtering the undesirable components from the fluid flow.

FIGS. 7a-7c show views of a variable nozzle assembly 700 according to an embodiment. The variable nozzle assembly 700 includes the outlet nozzle 430 described with reference to FIG. 4. The variable nozzle assembly 700 also includes a flow restrictor 710 that is disposed in the outlet nozzle 430. The flow restrictor 710 moves linearly in the outlet nozzle 430 to increase or decrease the fluid flow rate through the dual filter 100. Although the variable nozzle assembly 700 is shown as including the flow restrictor 710 in the outlet nozzle 430, alternative embodiments, such as the embodiment shown in FIG. 4, may not include the flow restrictor 710. The outlet nozzle 430 may control the flow of the fluid without the flow restrictor 710. The outlet nozzle 430 is shown as including a profile 432 that controls the flow rate of fluid flowing through the outlet nozzle 430. The outlet nozzle 430 can control the flow rate of the fluid through the dual filter 100.

The flow restrictor 710 is shown as a cone shaped plunger that moves linearly in the outlet nozzle 430. The linear movement in the outlet nozzle 430 changes the cross sectional area between the outlet nozzle 430 and the flow restrictor 710 through which the fluid may flow. The motor 720 may be a stepper motor that is adapted to rotate the spindle 730 to move the flow restrictor 710. The stepper motor may receive signals from the controller 310. The signals can be encoded so as to precisely control the rotation of the spindle 730. As will be described in more detail in the following, the movement of the flow restrictor 710 can control the flow of the fluid through the dual filter 100.

In operation, the fluid flow enters the inlet manifold 120 via the inlet 122, is filtered by the filter media 112a,b, and exits the outlet 132. The inlet manifold 120 can control the fluid flow to the filter media 112a,b. For example, the inlet manifold 120 can direct fluid flow to the first filter media 112a and prevent fluid flow to the second filter media 112b. Accordingly, in this example, the first filter media 112a will remove undesirable components from the fluid flow while the second filter media 112b is being purged with diverted filtered fluid flow.

The inlet manifold 120 can also switch the fluid flow between the filter media 112a,b. The valves 350a-d, operated by the solenoids 340a-d, direct the fluid flow to one of the filter media 112a,b. The valves 350a-d also direct purge flow from the other of the filter media 112a,b to the one or more exhaust ports 128. The valves 350a-d can be operated by pilot air that are controlled by the solenoids 340a,d. The pilot air is supplied, in some embodiments, by the outlet manifold 130 to the inlet manifold 120 via a pilot channel 510 in the housing 110. After being filtered by the first filter media 112a, the filtered fluid flow enters the outlet manifold 130.

The filtered fluid flowing from the filter media 112a is directed by the outlet manifold 130 to the outlet 132. The outlet manifold 130 also diverts some of the fluid flow from one of the filter media 112a,b to purge the other filter media 112a,b. The check valve 410 in the outlet manifold 130 diverts some of the filtered fluid flow to the pilot channel 510 to provide pilot fluid to operate the valves 350a-d. Due to the pilot fluid being filtered by the filter media 112a,b, the pilot fluid can be used to actuate the valves 350a-d without causing damage or reducing the life of the solenoids 340a-d or the valves 350a-d.

The dual filter 100 can control the fluid flow through the filter media 112a,b based on one or more fluid flow properties. The fluid flow properties can include, but is not limited to, temperature and humidity. For example, the dual filter 100 may sense the humidity and temperature of the fluid leaving the filter media 112a,b. If the humidity is too high, then the dual filter 100 may reduce the fluid flow rate through the dual filter 100. Reducing the fluid flow rate through the dual filters 100 increases the time that the filter media 112a,b can adsorb, for example, moisture from the fluid flow. Therefore, the humidity of the fluid flow leaving the filter media 112a,b can be reduced to the desired level. The desired fluid properties may be based on the criteria. For example, the dew point suppression may a criterion that determines the desired humidity. In colder environments, the dew point suppression criteria may require that the humidity of the fluid leaving the filter media 112a,b be lower than it would be in warmer temperatures.

The embodiments described above provide a dual filter 100. The dual filter 100 can remove one more components from the fluid flow, automatically monitor and control the fluid flow and continuously operate in different orientations. For example, the properties of the fluid flow leaving the dual filter 100 can be monitored and controlled. If the user of the dual filter 100 wishes to have fluid flow at a specified humidity and temperature, the user can program the controller 310 via the communications port 124. The user may also see information provided by the display 126 to program the controller 310. Once programmed, the dual filter 100 can automatically monitor and control the fluid flow as well as perform automatic purges of the filter media 112a,b.

The dual filter 100 can also continuously operate without intervention. For example, even though the filter media 112a,b become saturated with moisture over time, the dual filter 100 is adapted purge the filter media 112a,b by monitoring the filtered fluid flow from the filter media 112a,b or criteria such as the number of purges. In addition, the purge flow does not need to be a separate fluid source. The purge flow is redirected filtered fluid flow from one of the filter media 112a,b. In addition, the solenoids 340a-d are operated by diverted filtered fluid flow.

The dual filter 100 may also be oriented in a variety of directions. As discussed in the foregoing, the inlet manifold 120 receives the undesired components from the filter media 112a,b and the fluid flow. The inlet manifold 120 is adapted to drain the undesired components in a variety of orientations.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other dual filters, and not just to the embodiments described above and shown in the accompanying figures. Accordingly, the scope of the embodiments described above should be determined from the following claims.

We claim:

1. A dual filter for removing one or more components from a fluid flow, the dual filter comprising:
    a first filter media and a second filter media respectively disposed in a first conduit and a second conduit, each of the first and second conduits comprising a first opening at a first end and a second opening at a second end;
    an inlet manifold coupled to the first openings of the first and second conduits, the inlet manifold comprising a plurality of valves;
    a controller operably coupled to the plurality of valves, wherein the controller is configured to actuate the plurality of valves between an open state and a closed state to direct the fluid flow to one of the first and second filter media;
    an outlet manifold coupled to the second openings of the first and second conduits, the outlet manifold comprising a purge orifice that extends between the second opening of the first conduit and the second opening of the second conduit to divert a first portion of the fluid flow leaving the one of the first and second filter media to the other one of the first and second filter media to purge the other one of the first and second filter media; and
    wherein the purge orifice is a variable nozzle that is controlled by the controller to regulate a fluid flow rate of the first portion of the fluid flow that is diverted to purge the other one of the first and second filter media during operation of the dual filter.

2. The dual filter of claim 1 wherein the outlet manifold comprises a nozzle adapted to control a fluid flow rate through the first and second filter media.

3. The dual filter of claim 1 wherein the inlet manifold comprises a plurality of exhaust ports fluidly coupled to the first and second filter media.

4. The dual filter of claim 1 wherein the inlet manifold comprises one or more drain recesses and a plurality of purge drain holes configured to drain fluid from the inlet manifold in at least two orientations.

5. The dual filter of claim 1 wherein the outlet manifold further comprises a check valve, wherein the check valve is fluidly coupled to a pilot channel, and wherein the check valve is configured to divert a second portion of the fluid leaving the one of the first and second filter media through the pilot channel to supply the second portion of the fluid flow to the plurality of valves to actuate the plurality of valves.

6. The dual filter of claim 1 further comprising two-way diffuser-concentrators positioned in the first and second conduits between the first and second filter media and the outlet manifold, wherein the two-way diffuser-concentrators are configured to diffuse the fluid flow to the first and second filter media and concentrate the fluid flow from the first and second filter media.

7. The dual-filter of claim 6 wherein the two-way diffuser-concentrators are further adapted to hold the first and second filter media in the first and second conduits.

8. The dual-filter of claim 6 wherein the two-way diffuser-concentrators are conical.

9. The dual-filter of claim 6 wherein the two-way diffuser-concentrators are comprised of at least an inner diffuser-concentrator and an outer diffuser-concentrator.

10. The dual filter of claim 1 further comprising one or more porous retaining discs disposed between the first and second filter media and the outlet manifold to retain the first and second filter media.

11. The dual filter of claim 1 wherein the first and second conduits are in a housing that further includes a pilot channel that extends from an end of the housing that is adjacent to the outlet manifold to the inlet manifold, and wherein a portion of the fluid flow leaving the one of the first and second filter media is diverted to the pilot channel to carry pilot fluid from the outlet manifold to the inlet manifold.

12. The dual filter of claim 1 wherein the inlet manifold further comprises a heater adapted to heat the first and second filter media to reduce a purge time of the filter media.

13. A method of forming a dual filter and removing one or more components from a fluid flow in the dual filter, the method comprising:
   disposing a first filter media in a first conduit and disposing a second filter media in a second conduit, each of the first and second conduits having a first opening at a first end and a second opening at a second end;
   coupling an inlet manifold to the first openings of the first and second conduits;
   coupling an outlet manifold to the second openings of the first and second conduits, the outlet manifold comprising a purge orifice that extends between the second opening of the first conduit and the second opening of the second conduit, wherein the purge orifice comprises a variable nozzle;
   controlling the fluid flow through one of the first and second filter media by opening and closing one or more of a plurality of valves located in the inlet manifold;
   diverting a first portion of the fluid flow leaving the one of the first and second filter media through the purge orifice to the other one of the first and second filter media to purge the other one of the first and second filter media; and
   controlling the variable nozzle of the purge orifice to regulate a fluid flow rate of the first portion of the fluid flow that is diverted to purge the other one of the first and second filter media during operation of the dual filter.

14. The method of claim 13 further comprising providing a nozzle in the outlet manifold to control a fluid flow rate through the one of the first and second filter media.

15. The method of claim 13 further comprising providing a plurality of exhaust ports in the inlet manifold and fluidly coupled to the first and second filter media.

16. The method of claim 13 further comprising providing one or more drain recesses and a plurality of purge drain holes to drain fluid from the inlet manifold in at least two orientations.

17. The method of claim 13 wherein the outlet manifold comprises a check valve that is fluidly coupled to a pilot channel, and further comprising redirecting a second portion of the fluid flow from the one of the first and second filter media through the pilot channel to the plurality of valves that control the fluid flow.

18. The method of claim 13 further comprising two-way diffuser concentrators positioned in the first and second conduits between the first and second filter media and the outlet manifold, and wherein the two-way diffuser concentrators diffuse the fluid flow to the first and second filter media and concentrate the fluid flow from the first and second filter media.

19. The method of claim 18 wherein the two-way diffuser-concentrators hold the filter media in the first and second conduits.

20. The method of claim 18 wherein the two-way diffuser-concentrators are conical.

21. The method of claim 18 wherein the two-way diffuser-concentrators comprises at least an inner diffuser-concentrator and an outer diffuser-concentrator.

22. The method of claim 13 positioning one or more porous retaining discs between the first and second filter media and the outlet manifold to retain the first and second filter media.

23. The method of claim 13 further comprising forming a pilot channel through a housing that comprises the first and second conduits, and diverting a portion of the fluid flow leaving the one of the first and second filter media to the pilot channel to carry pilot fluid from the outlet manifold to the inlet manifold.

24. The method of claim 13 further comprising providing a heater in the inlet manifold to heat the first and second filter media to reduce a purge time of the first and second filter media.

25. A method of filtering a fluid flow with a dual filter, the method comprising:
   flowing a fluid through one of a first filter media and a second filter media from an inlet end of the one of the first and second filter media to an outlet end of the one of the first and second filter media;
   diverting a first portion of the fluid leaving the outlet end of the one of the first and second filter media through a purge orifice and into an outlet end of the other one of the first and second filter media, wherein the purge orifice comprises a variable nozzle; and
   adjusting a size of an opening of the variable nozzle of the purge orifice to regulate a fluid flow rate of the first portion of the fluid to purge the other one of the first and second filter media during operation of the dual filter.

26. The method claim 25 wherein the first and second portions of the fluid flow through a check valve prior to flowing through the pilot channel and the outlet nozzle.

27. The method claim 25 further comprising:
   flowing a second portion of the fluid leaving the outlet end of the one of the first and second filter media through a pilot channel that carries the second portion of the fluid to the plurality of valves; and
   flowing a third portion of the fluid leaving the outlet end of the one of the first and second filter media through an outlet nozzle.

* * * * *